US011772276B2

(12) United States Patent
Mecca et al.

(10) Patent No.: US 11,772,276 B2
(45) Date of Patent: Oct. 3, 2023

(54) SYSTEMS AND METHODS FOR OPTICAL PERFORMANCE CAPTURED ANIMATED FIGURE WITH REAL-TIME REACTIVE PROJECTED MEDIA

(71) Applicant: Universal City Studios LLC, Universal City, CA (US)

(72) Inventors: Anthony Alexander Mecca, Winter Garden, FL (US); Timothy J. Eck, Windermere, FL (US)

(73) Assignee: Universal City Studios LLC, Universal City, CA (US)

( * ) Notice: Subject to any disclaimer, the term of this patent is extended or adjusted under 35 U.S.C. 154(b) by 144 days.

(21) Appl. No.: 17/122,716

(22) Filed: Dec. 15, 2020

(65) Prior Publication Data

US 2021/0205999 A1    Jul. 8, 2021

Related U.S. Application Data

(60) Provisional application No. 62/956,468, filed on Jan. 2, 2020.

(51) Int. Cl.
*B25J 11/00*    (2006.01)
*G06T 7/73*    (2017.01)
(Continued)

(52) U.S. Cl.
CPC ......... *B25J 11/0015* (2013.01); *B25J 9/1615* (2013.01); *B25J 9/1697* (2013.01); *B25J 13/089* (2013.01); *G06T 7/73* (2017.01)

(58) Field of Classification Search
CPC .... B25J 11/0015; B25J 9/1615; B25J 9/1697; B25J 13/089; B25J 11/003; G06T 7/73;
(Continued)

(56) References Cited

U.S. PATENT DOCUMENTS 5,325,473 A    6/1994 Monroe et al.
5,852,672 A   12/1998 Lu
(Continued)

FOREIGN PATENT DOCUMENTS

CN    108921779 A    11/2018
CN    109571507 A    4/2019
(Continued)

OTHER PUBLICATIONS

C. Siegl, V. Lange, M. Stamminger, F. Bauer and J. Thies, "FaceForge: Markerless Non-Rigid Face Multi-Projection Mapping," in IEEE Transactions on Visualization and Computer Graphics, vol. 23, No. 11, pp. 2440-2446, Nov. 2017, doi: 10.1109/TVCG.2017.2734428.*
(Continued)

*Primary Examiner* — Jeff A Burke
*Assistant Examiner* — Blake A Wood
(74) *Attorney, Agent, or Firm* — Fletcher Yoder, P.C.

(57) ABSTRACT

A reactive media system includes a motion control system having an animated figure with a body and actuators configured to adjust a figure portion of the body in response to interactive data received from one or more interactive data sources. The reactive media system includes a media control system having a tracking camera configured to generate signals indicative of a current position and orientation of the figure portion based on a set of trackers coupled to the figure portion. The media control system includes a media controller configured to receive the signals, determine the current position and orientation based on the signals, and generate data indicative of images to be projected onto an external surface of the figure portion having the current position and orientation. The media control system also includes a projector configured to receive the data from the media controller and project the images onto the external surface.

24 Claims, 7 Drawing Sheets

(51) Int. Cl.
B25J 9/16 (2006.01)
B25J 13/08 (2006.01)

(58) Field of Classification Search
CPC ........... G05B 2219/35444; G05B 2219/40411; G09F 2027/001; G09F 27/005; G09F 19/08; G09F 19/18
See application file for complete search history.

(56) References Cited

U.S. PATENT DOCUMENTS

| | | | |
|---|---|---|---|
| 8,259,997 | B2 | 9/2012 | Audet et al. |
| 8,965,583 | B2 | 2/2015 | Ortmaier et al. |
| 9,300,901 | B2 | 3/2016 | Grundhofer et al. |
| 9,472,011 | B2 | 10/2016 | Linnell |
| 9,958,767 | B1 | 5/2018 | Reichow et al. |
| 10,131,171 | B2 | 11/2018 | Sumikawa et al. |
| 2008/0013826 | A1 | 1/2008 | Hillis et al. |
| 2014/0354787 | A1* | 12/2014 | Linnell ............ H04N 5/2224 348/61 |
| 2015/0193964 | A1 | 7/2015 | Kim et al. |
| 2018/0071643 | A1 | 3/2018 | Cortelyou et al. |
| 2018/0095607 | A1* | 4/2018 | Proctor ............ G06T 19/006 |
| 2018/0122122 | A1 | 5/2018 | Reichow et al. |
| 2018/0213195 | A1 | 7/2018 | Junuzovic et al. |
| 2019/0302991 | A1 | 10/2019 | Vyas et al. |

FOREIGN PATENT DOCUMENTS

| | | |
|---|---|---|
| JP | 2016152586 A | 8/2016 |
| KR | 20160109867 A | 9/2016 |

OTHER PUBLICATIONS

R. Mayet, J. Diprose and A. K. Pandey, "Towards automatic visual fault detection in highly expressive human-like animatronic faces with soft skin," 2019 28th IEEE International Conference on Robot and Human Interactive Communication (RO-MAN), 2019, pp. 1-6, doi: 10.1109/RO-MAN46459.2019.8956418.*
Urtans, Evalds, and Agris Nikitenko. "Active infrared markers for augmented and virtual reality." markers 9 (2016).*
M. T. K. Tsun, B. T. Lau, H. Siswoyo Jo and S. L. Lau, "A human orientation tracking system using Template Matching and active Infrared marker," 2015 International Conference on Smart Sensors and Application (ICSSA), 2015, pp. 116-121.*
PCT/US2020/066314 International Search Report and Written Opinion dated Apr. 13, 2021.

* cited by examiner

SYSTEMS AND METHODS FOR OPTICAL PERFORMANCE CAPTURED ANIMATED FIGURE WITH REAL-TIME REACTIVE PROJECTED MEDIA

CROSS-REFERENCE TO RELATED APPLICATION

This application claims priority to and the benefit of U.S. Provisional Application No. 62/956,468, entitled "SYSTEMS AND METHODS FOR OPTICAL PERFORMANCE CAPTURED ANIMATED FIGURE WITH REAL-TIME REACTIVE PROJECTED MEDIA," filed Jan. 2, 2020, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues contain, among many other attractions, animated figures to entertain park guests that are queued for or within a ride experience. Certain animated figures may be brought to life by projection mapping, which traditionally directs predetermined appearances onto the animated figures. For example, a particular animated figure may be visually supplemented with a canned or fixed set of images, which may align with preprogrammed movements of the animated figure. While such techniques may provide more entertainment than flat display surfaces, it is presently recognized that advancements may be made to further immerse the guests within a particular attraction, ride, or interactive experience. For example, certain animated figures have an internally-positioned projector that generates an unrealistic backlighting or glow via internal or rear projection through a semi-transparent projection surface of the animated figure. As such, it is now recognized that it is desirable to make the animated figures appear more lifelike, as well as to provide the animated figures with the ability to contextually blend with their environment in a realistic, convincing manner.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a reactive media system of an amusement attraction includes a motion control system that includes an animated figure having a body and a set of actuators configured to adjust a figure portion of the body in response to interactive data received from one or more interactive data sources. The motion control system also includes a set of trackers coupled to the figure portion of the body. The reactive media system includes a media control system that includes a tracking camera configured to generate signals indicative of a current position and a current orientation of the figure portion based on the set of trackers. The media control system includes a media controller coupled to the tracking camera and configured to receive the signals indicative of the current position and the current orientation. The media control system is also configured to determine the current position and the current orientation based on the signals and generate data indicative of images to be projected onto an external surface of the figure portion having the current position and the current orientation. The media control system also includes a projector communicatively coupled to the media controller. The projector is configured to receive the data indicative of the images from the media controller and project the images onto the external surface of the figure portion having the current position and the current orientation.

In an embodiment, a method of operating a reactive media system of an amusement attraction includes receiving, via a figure controller of an animated figure, interactive data from one or more interactive data sources of the amusement attraction and generating, via the figure controller, an interactive response of the animated figure based on the interactive data. The method includes instructing, via the figure controller, actuators disposed within the animated figure to perform the interactive response by moving at least a portion of a body of the animated figure. The method also includes receiving, via a media controller, sensor feedback indicative of a current position and orientation of the body of the animated figure from a tracking camera coupled to the media controller. The tracking camera is configured to sense the current position and orientation based on at least one tracker concealed on the body of the animated figure. Additionally, the method includes generating, via the media controller, a set of images to be projected onto an external surface of the body of the animated figure having the current position and orientation and instructing, via the media controller, a projector to contour map the set of images onto the external surface of the body having the current position and orientation.

In an embodiment, a reactive media system of an amusement attraction includes one or more interactive data sources configured to generate interactive data that is variable over time and a motion control system that includes an animated figure disposed within the amusement attraction. The animated figure includes a figure portion that includes a moveable joint. The motion control system also includes a set of actuators disposed within the figure portion and configured to actuate the moveable joint. Additionally, the motion control system includes a figure controller communicatively coupled to the set of actuators and the one or more interactive data sources. The figure controller is configured to, based on the interactive data from the one or more interactive data sources, determine an interactive response of the animated figure corresponding to a current state of the animated figure. The interactive response includes actuating the moveable joint. The figure controller is also configured to instruct the set of actuators to perform the interactive response. Moreover, the reactive media system includes a set of trackers coupled to the figure portion of the animated figure. The set of trackers enables a media control system of the reactive media system to project images onto an external surface of the figure portion of the animated figure in synchronization with the interactive response of the motion control system.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
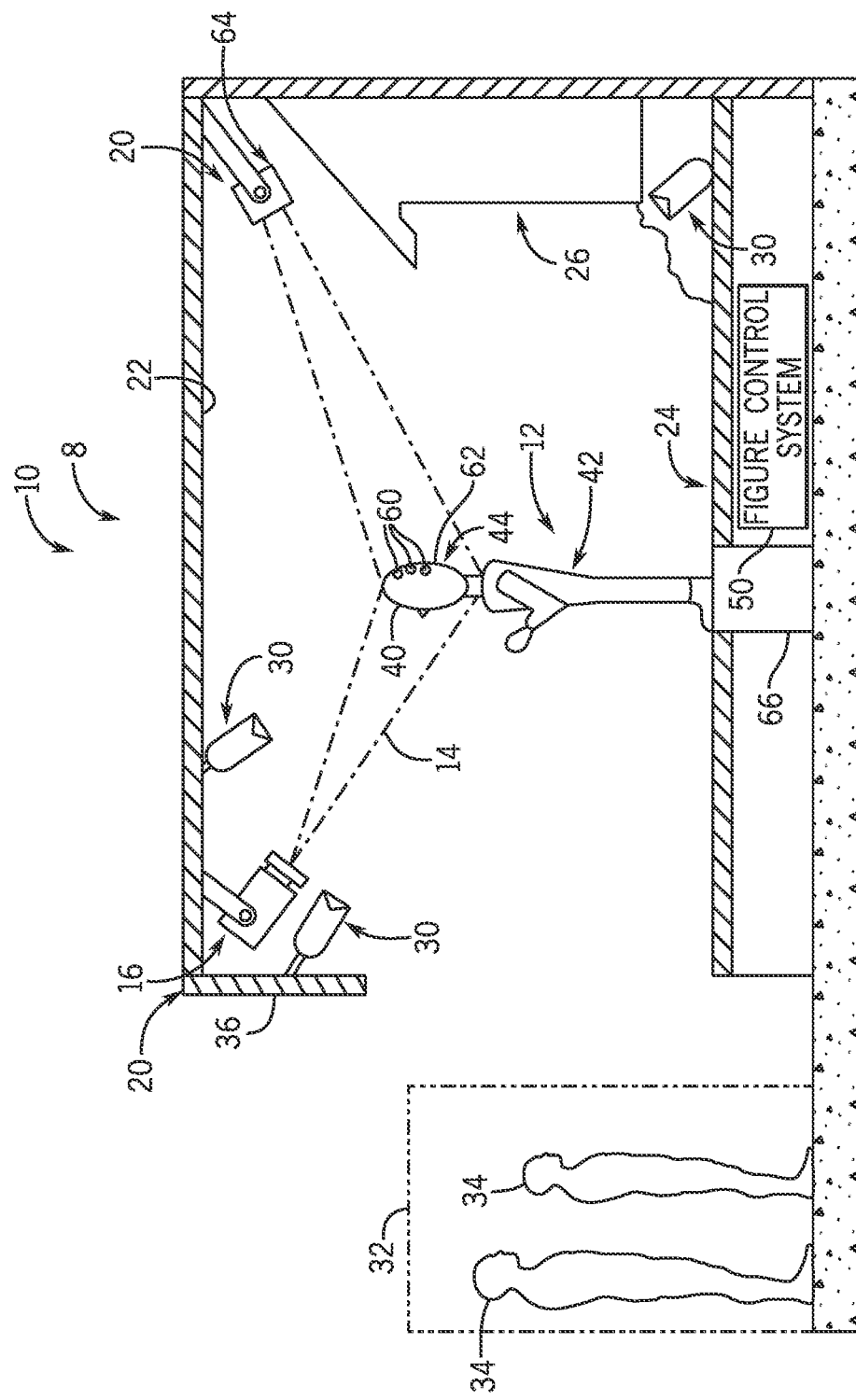
FIG. 1 is a schematic diagram illustrating an embodiment of an amusement attraction or experience having a reactive media system to control projection-mapped images displayed on an animated figure, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are directed to a reactive media system for an amusement attraction, such as an attraction in which a projector of a media control system directs images onto an external surface of an animated figure. Notably, the animated figure responds to any suitable number of interactive data sources or streams, which may include a current state of the animated figure, control instructions from an artificial intelligence (AI) engine, actions or passive qualities of guests, actions of backstage or on-stage performers, and so forth. As such, the reactive media system provides a dynamic and immersive experience to guests, in which the animated figure resembles a real person or character more closely than achievable before the present techniques. In particular, by projection mapping onto the external surface of the animated figure, the animated figure may appear more lifelike than certain animated figure systems that internally project images through a semi-transparent surface of an animated figure, thereby generating an unnatural or ethereal glowing appearance. As discussed herein, the reactive media system leverages external tracking (e.g., via optical performance capture or optical motion capture) of the animated figure to dynamically generate and provide images onto the external surface of the animated figure, thereby reducing or eliminating any unnatural backlighting. Indeed, because certain animated figures may include an internal projector within a body of the animated figure, the internal projector does not move relative to the animated figure and thus figure or movement tracking is not required. As an additional benefit, positioning the projector external to the animated figure enables space within the animated figure to house more complex or numerous actuators, which may otherwise block or physically interfere with traditional internal projection mapping techniques.

In more detail, to enhance the authenticity of the animated figure, the animated figure may be fitted with trackers that enable tracking cameras of a media control system to discern movements, positions, and orientations of the animated figure in real-time via optical performance capture or optical motion capture. Thus, because the media control system may operate independently of the animated figure (e.g., by not relying on position, velocity, and/or acceleration information regarding actuators of the animated figure), the media control system may dynamically generate and fit projected images onto the interactive animated figure at a realistic framerate that emulates live characters, such as by presenting textures, colors, and/or movements that appear to be indistinguishable from the animated figure. As will be understood, the media control system of certain embodiments may generate and update a skeletal model of the animated figure based on feedback from the tracking cameras. The skeletal model generally represents the moveable portions of the animated figure, such as actuatable joints thereof, and is dynamically updated to represent a current three-dimensional position (e.g., including x, y, and z coordinates), orientation, and scale of the animated figure or portions thereof (e.g., a pose of the animated figure). The media control system therefore utilizes the skeletal model to generate the images for projection that precisely suit the current position and orientation of the reactive and/or interactive animated figure. The reactive media system therefore provides the motion control system having the animated figure that is responding to the interactive data, as well as the media control system that is reactive to the mechanical performance of the animated figure. As discussed below, these two closed control loops therefore provide improved system performance based on the optical motion capture of the animated figure to deliver an engaging character presentation to guests, regardless of the mechanical positioning of the animated figure.

As illustrated in FIG. 1, a reactive media system 8 of an amusement attraction 10 includes an animated FIG. 12 that receives images 14 (e.g., projected content) from a projector 16 (e.g., external projector, optical projector with lens) of a media control system 20. In the present embodiment, the amusement attraction 10 is a show set having a stage ceiling 22, a stage floor 24, and scenery objects 26 disposed between the stage ceiling 22 and the stage floor 24. The show set may also include any suitable stage lighting devices 30, such as the illustrated lighting instruments or devices. From a guest area 32 of the amusement attraction 10, multiple guests 34 may view and/or interact with the animated FIG. 12, in accordance with the present techniques. Although illustrated as within a stage-type environment, it should be understood that the reactive media system 8 may be utilized to entertain guests 34 in any suitable entertainment environment, such as a dark ride, an outdoor arena, an environment adjacent to a ride path of a ride vehicle carrying the guests 34, and so forth.

Notably, the projector 16 is external to the animated FIG. 12, thereby enabling an enclosed volume within the animated FIG. 12 to be utilized to house components other than the projector 16, such as certain actuation systems discussed below. In the illustrated embodiment, the projector 16 is disposed in front of the animated FIG. 12 and obstructed from sight of the guests 34 by an overhang 36 of the stage ceiling 22. It should be recognized that the overhang 36 may alternatively be a curtain or that the amusement attraction 10 may take any other suitable form for enabling the guests 34 to view the animated FIG. 12. In other embodiments, the projector 16 may be positioned behind the guests 34. In any case, the projector 16 directs the images 14 onto an external surface 40 of a body 42 of the animated FIG. 12, which corresponds to a head portion 44 of the animated FIG. 12, in the present embodiment. The media control system 20 may therefore deliver realistic and engaging textures to the head portion 44 from a concealed location, thereby providing an immersive and interactive experience to the guests 34. Indeed, as previously mentioned, the media control system 20 of the reactive media system 8 enables the animated FIG. 12 to appear more lifelike than an animated figure with internal projection, because the media control system 20 does not produce an internal, unnatural glow of the animated FIG. 12 that an internally-positioned projector of certain animated figures may generate.

As recognized herein, the animated FIG. 12 is part of a motion control system 50 (e.g., figure control system, prop control system) that operates independently of the media control system 20, in certain embodiments. For example, the motion control system 50 may receive interactive data from any suitable reactive and/or interactive data sources, discussed in more detail below. Thus, the animated FIG. 12 may leverage the interactive data to dynamically update or modify its interactions with the amusement attraction 10 and/or the guests 34 therein. It should be understood that the motion control system 50 may instruct actuators to adjust the position of any suitable components of the amusement attraction 10 that may be viewable to the guests 34. Additionally, as discussed in more detail with reference to FIGS. 2 and 3 below, based on suitable interactive data, the motion control system 50 may generate an interactive and/or reactive response and instruct actuators of the animated FIG. 12 and/or the motion control system 50 to perform the interactive and/or reactive response in real-time. As described below, the reactive media system 8 may also coordinate operation of the stage lighting devices 30 and/or any interactive or actuatable components of the scenery objects 26 to provide a response to the interactive data sources that coordinates with the response of the animated FIG. 12. Moreover, the motion control system 50 may control an actuatable motion device 66 (e.g., actuatable motion base) that is physically coupled to the animated FIG. 12. The actuatable motion device 66 may be any suitable motion-generating assembly that may move (e.g., translate, rotate) the animated FIG. 12 laterally, longitudinally, and/or vertically. However, it should be understood that, in other embodiments, the actuatable motion device 66 may be or include a suspension system and/or flying system that is coupled to the animated FIG. 12 from above the stage floor 24. Therefore, the suspension system and/or flying system of the actuatable motion device 66 may include any suitable actuators designed to move the animated FIG. 12 laterally, longitudinally, and/or vertically.

Notably, the motion control system 50 includes trackers 60 (e.g., trackable markers) that are positioned on a back surface 62 of the animated FIG. 12, in the present embodiment. As recognized herein, the trackers 60 may be positioned on or within any suitable surface of the animated FIG. 12 that enables the trackers 60 to be concealed from guest view. The trackers 60 enable a tracking camera 64 of the media control system 20 to sense or resolve a position and an orientation of the animated FIG. 12 within the amusement attraction 10, such as via optical performance capture or optical motion capture techniques. The tracking camera 64 may also be inconspicuous or concealed from view by the guests 34 in any suitable manner, such as by being positioned on the stage ceiling 22 or hidden within the scenery objects 26. Thus, as will be understood, the projector 16 may provide the images 14 onto the animated FIG. 12 in synchronization with an actual, current position and orientation (e.g., pose) of the animated FIG. 12, without relying on position, velocity, and/or acceleration information from actuators of the animated FIG. 12, to provide improved show quality with reduced latency and enhanced realism. In other embodiments, the media control system 20 may verify the positioning and operation of the projector 16 based on actuator-derived information from the motion control system 50.

It should be understood that the reactive media system 8 may include any suitable number of projectors 16, trackers 60, and tracking cameras 64. For example, more than one animated FIG. 12 may be included within a single amusement attraction 10. As such, when multiple animated FIG. 12 are provided that are viewable to the guests 34 from a single side of the show set, the reactive media system 8 may include at least one projector 16 for each animated FIG. 12. However, it is presently recognized that the particular infrastructure of the reactive media system 8 enables any number of animated FIG. 12 that are moveable within an optical range of at least one tracking camera 64 and moveable within a projection cone of at least one projector 16 to receive the images 14, without substantial redesign or reconfiguration of the reactive media system 8. In other words, as additional animated FIG. 12 are provided with trackers 60 and placed within the amusement attraction 10, the reactive media system 8 may readily detect and accommodate the additional animated FIGS. 12, in accordance with the present disclosure. In other embodiments, multiple projectors 16 may be provided to deliver content to multiple sides of a single animated FIG. 12, such as an animated FIG. 12 that may be approached by guests 34 from multiple portions of the show set. Additionally, certain embodiments of the animated FIG. 12 may include at least two trackers 60 to enable the tracking camera 64 to resolve the relative positioning of the at least two trackers 60 for efficient tracking of the animated FIG. 12, though it should be understood that changes in position of a single tracker 60 may also enable resolution of the position of the animated FIG. 12, with a less complex system.

Figure 2:
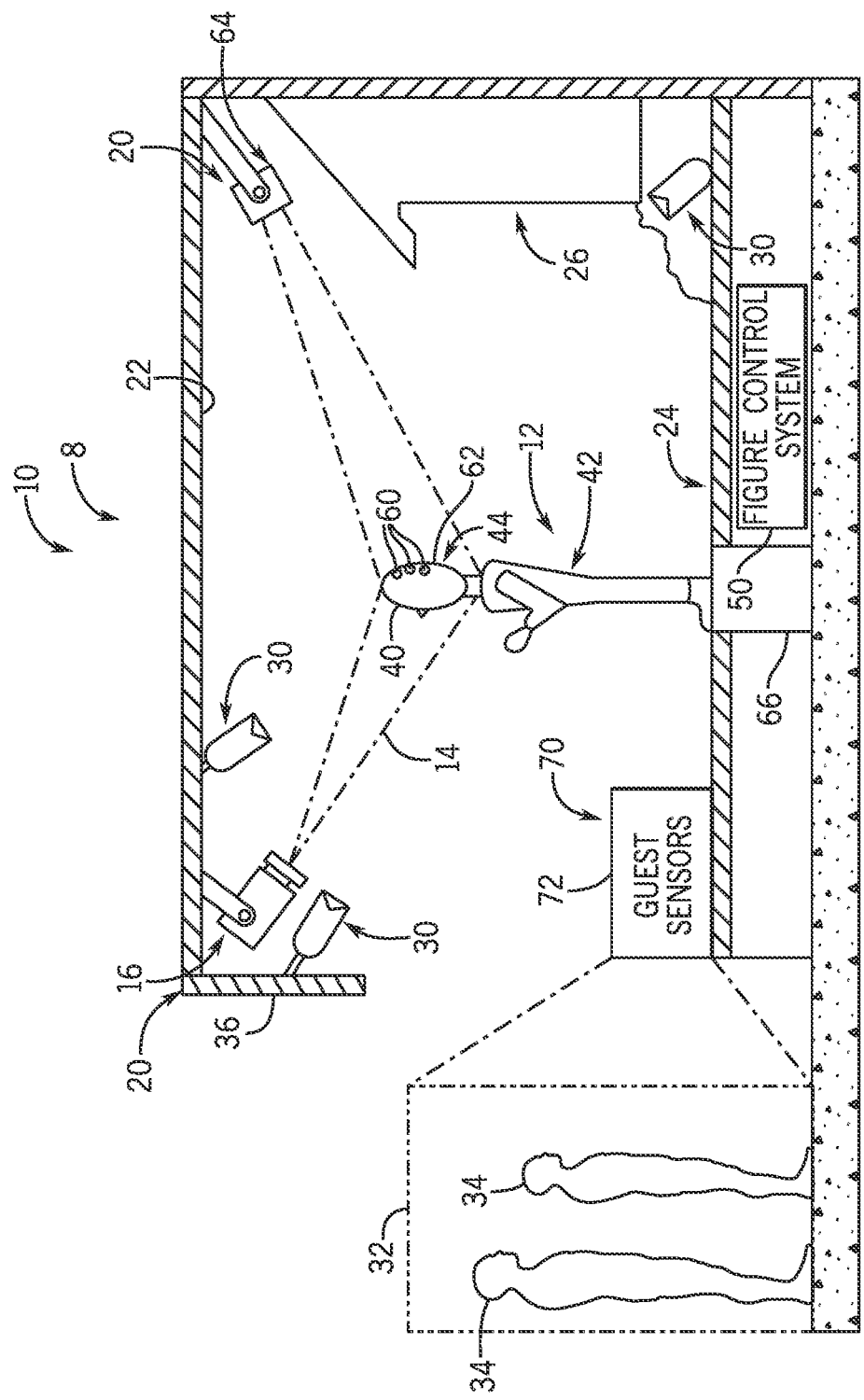
FIG. 2 is a schematic diagram illustrating an embodiment of the reactive media system including guest sensors that enable the animated figure to react to guest input, in accordance with embodiments of the present disclosure.

FIG. 2 illustrates an embodiment of the reactive media system 8 of the amusement attraction 10 including the media control system 20 and the motion control system 50, as well as an example of an interactive data source 70 that includes guest sensors 72. In the present embodiment, the guest sensors 72 collect guest input from any guests 34 within the guest area 32. As recognized herein, the guest input is one form of interactive data that may be utilized by the animated FIG. 12 to adaptively respond to a current state of the animated FIG. 12 or amusement attraction 10. In the present embodiment, the guest sensors 72 may be any suitable devices that collect data from or regarding the guests 34 as the interactive data. The guest input collected by the guest sensors 72 may include active input and/or passive input, in certain embodiments. For example, the animated FIG. 12 may respond to macroscopic gestures of the guests 34 by implementing gestural recognition. As passive input, the animated FIG. 12 may respond to determined positions, orientations, features, and/or heights of the guests 34. Additionally, in certain embodiments, the guest sensors 72 include physical input devices, such as buttons, levers, knobs, and so forth. Moreover, it should be understood that the guest sensors 72 may collect any suitable visual data, auditory data, haptic input, data from interactive guest devices (e.g., smart phones, tablets), identification information from guest arm bands, input from interactive guest toys, and so forth.

As mentioned, based on the interactive data, the motion control system 50 may generate an interactive and/or reactive response for the animated FIG. 12 to perform, and then instruct actuators of the animated FIG. 12 to perform the interactive and/or reactive response. As a particular, non-limiting example, the motion control system 50 may determine that the interactive data includes guest input indicative of one guest 34 physically and/or verbally greeting the animated FIG. 12 from an edge portion of the guest area 32. Then, the motion control system 50 may dynamically instruct the animated FIG. 12 to perform an interactive, physical response to the greeting of the guest 34. For example, the motion control system 50 may control the animated FIG. 12 to rotate to face the guest 34, while waving an arm of the animated FIG. 12. As another particular example of the interactive response, the motion control system 50 may control the animated FIG. 12 to respond to the guest input by moving closer to a determined position of the guest 34 (e.g., via the actuatable motion device 66 disposed underneath the animated FIG. 12) and tilting the head portion 44 of the animated FIG. 12 to provide the appearance of focus on or eye contact with the guest 34 having a particular height, and so forth.

Figure 3:
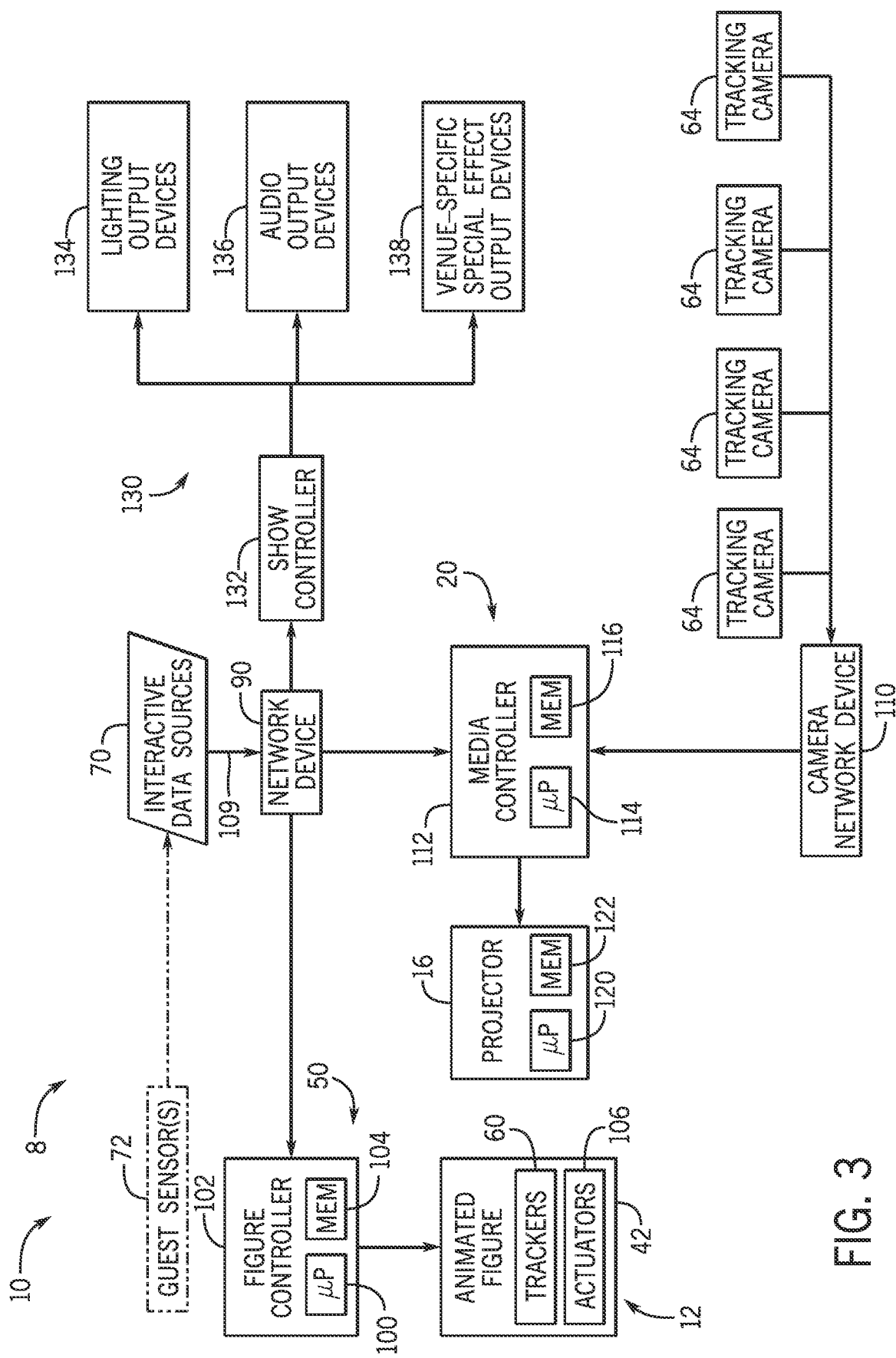
FIG. 3 is a block diagram of an embodiment of the reactive media system of FIG. 1 or 2 that enables the animated figure to react to interactive data sources, such as based on a media control system that detects movements and positions of the animated figure, in accordance with embodiments of the present disclosure.

With the above understanding of the general operation of the reactive media system 8 in mind, further discussion is provided herein regarding certain embodiments of particular components of the reactive media system 8. For example, FIG. 3 is a block diagram of the reactive media system 8 illustrating the media control system 20 that may operate to externally deliver content or images to the animated FIG. 12, without communicatively coupling to the motion control system 50. In other words, the media control system 20 does not directly transmit to or receive communication signals from the motion control system 50. However, as discussed below, the interactive data sources 70 may be communicatively coupled upstream of both the media control system 20 and the motion control system 50 to enable coordination of the media control system 20 and the motion control system 50, without intercommunication between the control systems 20, 50. Moreover, in certain embodiments, a network device 90, such as a switch or a hub, may be communicatively coupled directly downstream of the interactive data sources 70 to facilitate efficient communications between the interactive data sources 70 and the control systems 20, 50. However, it should be understood that the network device 90 may be omitted, that multiple network devices 90 may be implemented, or that any other suitable data management device may be utilized to facilitate delivery of data from the interactive data sources 70 to the control systems 20, 50. In the illustrated embodiment, the animated FIG. 12 includes a figure processor 100 and a figure memory 104, which may collectively form all or a portion of a figure controller 102 of the motion control system 50. The animated FIG. 12 also includes the trackers 60 disposed on the body 42 of the animated FIG. 12 to enable the tracking cameras 64 of the media control system 20 to sense the position and orientation, or pose, of the animated FIG. 12. The trackers 60 may be active devices, which may each emit an individualized signal to the tracking cameras 64. For example, the trackers 60 may emit infrared light, electromagnetic energy, or any other suitable signal that is undetectable by the guests 34 while being distinguishable by the tracking cameras 64. Alternatively, the trackers 60 may be passive devices (e.g., reflectors, pigmented portions) that do not emit a signal and that enable the tracking cameras 64 to precisely distinguish the passive devices from other portions of the animated FIG. 12 and/or amusement attraction 10.

Moreover, the animated FIG. 12 is fitted with any suitable actuators 106 that enable the animated FIG. 12 to move (e.g., ambulate, translate, rotate, pivot, lip synchronize) in a realistic and life-emulating manner. The actuators 106 may include servo motors, hydraulic cylinders, linear actuators, and so forth that are each positioned and coupled to develop relative motion between respective portions of the animated FIG. 12. For example, respective sets of actuators 106 may be positioned to move an arm of the animated FIG. 12, move an articulating jaw of the animated FIG. 12, manipulate a figure portion (e.g., the head portion 44, arm portion, torso portion, leg portion) of the animated FIG. 12, and so forth. As mentioned above, the interactive data sources 70 may include any suitable data source that provides a variable set of data over time as interactive data 109. As such, in certain embodiments of the interactive data sources 70 that include input sensors or guest sensors 72 (e.g., depth cameras, input devices, motion sensors), the guest sensors 72 may sense guest interactions with the animated FIG. 12 and relay interactive data indicative of the guest interactions to the figure controller 102. In any case, based on the interactive data 109 from the interactive data sources 70, the figure controller 102 may instruct the actuators 106 to dynamically manipulate the animated FIG. 12 to immediately respond and adapt to any suitable interactive data 109 that may be variable over time, as discussed in more detail below.

Communicatively coupled (e.g., via wireless or wired communication paths) to the figure controller 102, the interactive data sources 70 may include any one or more suitable components that generate and transmit the interactive data 109 to the figure controller 102 and/or the media controller discussed below. For example, the interactive data sources 70 may include a dedicated game engine or computing device that dynamically generates instructions executable by the animated figure controller 102 to cause the animated FIG. 12 to modify its movements within the amusement attraction 10. In some embodiments, the dedicated game engine may be embedded within the animated figure controller 102 as a suitable module thereof. In certain embodiments, the interactive data 109 provided by the interactive data sources 70 includes input or instructions received from a health status monitoring system of the motion control system 50, from a global or main control system of the amusement attraction 10, from a computing device associated with a technician of the amusement attraction 10, and so forth. As further examples, the interactive data 109 may additionally or alternatively include time of day data, weather data, social media data, stock market data, ride vehicle position data, or any suitable data stream that may vary over time. It should be understood that the animated FIG. 12 may therefore adaptively respond to any suitable number of interactive data sources 70. Indeed, the interactive data 109 provided by the interactive data sources 70 includes any suitable stream(s) of input information that may be selectively constant and/or variable over time to enable the animated figure controller 102 to dynamically control the operation of the animated FIG. 12. As such, the motion control system 50 may perform a figure feedback loop that modifies or verifies operations of the animated FIG. 12 based on the interactive data 109.

Additionally, in some embodiments, the interactive data sources 70 may include the guest sensors 72, which include any combination of components that are suitable for resolving the guest interactions. Indeed, it is presently recognized that the guest interactions may be sensed by any suitable optical, mechanical, electro-mechanical, electro-magnetic, auditory, pressure, and/or temperature transducers or sensors of any kind. As particular, non-limiting examples, the guest sensors 72 may include any suitable number or combination of computer vision sensors (e.g., cameras), depth cameras, Light Detection and Ranging (LIDAR) devices, motion sensors, audio recording and/or processing devices, touch capacitance sensors, light sensors, pressure or floor mat sensors, radio-frequency (RF) sensors that receive a uniquely identifying RF signal from a user wearable device having a radio-frequency identification (RFID) tag, and so forth. That is, the guest sensors 72 may include any suitable components or transducers that generate a signal based on monitoring the guests 34 in the guest area 32. Although illustrated as including the guest sensors 72 external to the body 42 of the animated FIG. 12, it should be understood that other embodiments of the motion control system 50 may include all or a portion of the guest sensors 72 disposed within the body 42 of the animated FIG. 12. In other embodiments, the interactive data sources 70 of the motion control system 50 may exclude the guest sensors 72 and enable the animated FIG. 12 to adaptively respond to any other suitable source(s) of interactive data 109.

As illustrated, the present embodiment of the media control system 20 includes the projector 16, four tracking cameras 64, a camera network device 110, and a media controller 112. The media controller 112 is communicatively coupled to the interactive data sources 70 (e.g., via the network device 90), thereby enabling the media controller 112 to dynamically react to the physical environment of the amusement attraction 10, such as by determining whether guest input or another change-causing source of interactive data 109 is received. Additionally, the media control system 20 may be communicatively isolated from the motion control system 50, as shown in the present embodiment. That is, the motion control system 50 is independent from the media control system 20, while the media control system 20 follows or depends on the animated FIG. 12. Thus, the media control system 20 provides operational freedom to the animated FIG. 12 for adaptively responding to the interactive data 109 in substantially real-time (e.g., within microseconds or milliseconds of an interaction), while the media control system 20 monitors or traces movements of the animated FIG. 12 to project immersive textures or images thereon also in substantially real-time. As such, while the motion control system 50 performs the figure feedback loop, the media control system 20 simultaneously performs a media feedback loop that modifies or verifies the images that are projected onto the animated FIG. 12. To gather information regarding a current position and orientation of the animated FIG. 12, the media control system 20 leverages the tracking cameras 64, which are suitably positioned within the amusement attraction 10 to identify or pinpoint the trackers 60 of the animated FIG. 12 via optical motion capture techniques. A type or configuration of the tracking cameras 64 may be individually selected to correspond to a type of the trackers 60. As a brief summary, when using active devices as the trackers 60, the tracking cameras 64 may be designed to receive signals from the active devices to sense the position of the animated FIG. 12. When using passive devices as the trackers 60, the tracking cameras 64 may be designed to discern the passive devices on the external surface 40 of the animated FIG. 12. The positioning of these trackers 60, in conjunction with geometric or skeletal models of the animated FIG. 12, facilitates coordination of projection onto the animated FIG. 12 in different orientations.

The tracking cameras 64 of the illustrated embodiment are communicatively coupled to the camera network device 110, which relays signals indicative of the current three-dimensional position (e.g., including x, y, and z coordinates), orientation, and scale of the animated FIG. 12 or portions thereof (e.g., a pose of the animated FIG. 12) to the media controller 112. The camera network device 110 is therefore a network switch or sensor hub that consolidates multiple streams of information from the tracking cameras 64 for efficient processing by the media controller 112. The media controller 112 includes a media processor 114 and a media memory 116, which operate together to determine, generate, and/or adjust dynamic textures or images to be overlaid onto the animated FIG. 12 in its current position and orientation. Then, the media controller 112 may instruct the projector 16 to project dynamic images onto the animated FIG. 12. The images may be wholly rendered on demand based on a current pose (e.g., position, orientation, and scale) of the animated FIG. 12. In less complex configurations, the images may be generated by adapting a prerecorded video stream to the current pose of the animated FIG. 12. The media controller 112 may be any suitable media generator or game engine with significant processing power and reduced latency, in accordance with the present disclosure. It should be understood that the media controller 112 is therefore capable of generating the images to be projected onto the animated FIG. 12 in substantially real-time, based on the sensor data received from the tracking cameras 64. Indeed, the media controller 112 may maintain a skeletal model or algorithm that represents the animated FIG. 12 and its actuatable portions (e.g., jaw, limbs, joints). Based on the sensor data, the media controller 112 may update the skeletal model to represent an actual, current position and orientation of the animated FIG. 12, and then generate the images to be projected onto the animated FIG. 12 having the current position and orientation.

The projector 16 may include a projector processor 120 and a projector memory 122 to facilitate the presentation of the images or dynamic textures onto the animated FIG. 12. The projector processor 120 generally receives data indicative of the images from the media controller 112, and then instructs a light source within the projector 16 to output the images through a lens. The projector 16 may be moveable or actuatable to follow and align with the animated FIG. 12, such as based on commands received from the media controller 112. Alternatively, the projector 16 may be stationary. In any case, the media controller 112 may determine a current silhouette or a shape of a target figure portion of the animated FIG. 12 that is to receive projected images based on the updated skeletal model, and then instruct the projector 16 to provide the images onto the silhouette. It should be understood that the projector 16 may therefore block off or mask out portions of the animated FIG. 12 and/or amusement attraction 10 that are not designed to receive the images 14, such as a wig of the animated FIG. 12, the scenery objects 26 behind the animated FIG. 12 relative to the projector 16, and so forth.

The processors 100, 114, 120 are each any suitable processor that can execute instructions for carrying out the presently disclosed techniques, such as a general-purpose processor, system-on-chip (SoC) device, an application-specific integrated circuit (ASIC), a processor of a programmable logic controller (PLC), a processor of an industrial PC (IPC), or some other similar processor configuration. These instructions are encoded in programs or code stored in a tangible, non-transitory, computer-readable medium, such as the memories 104, 116, 122 and/or other storage circuitry or device. As such, the figure processor 100 is coupled to the figure memory 104, the media processor 114 is coupled to the media memory 116, and the projector processor 120 is coupled to the projector memory 122.

The present embodiment of the reactive media system 8 also includes a show control system 130 that coordinates additional output devices of the amusement attraction 10 based on the interactive data sources 70. For example, a show controller 132 of the show control system 130 is communicatively coupled between the network device 90 and one or multiple lighting output devices 134, audio output devices 136, and/or venue-specific special effect output devices 138 (e.g., fog machines, vibration generators, actuatable portions of the scenery objects 26). The lighting output devices 134 may include the stage lighting devices 30 (e.g., including the lighting instruments), as well as any other light-generating components of the amusement attraction 10. Additionally, the audio output devices 136 may include any suitable speakers or noise-generating devices that are designed to output sounds based on instructions from the show controller 132. As such, based on the interactive data 109 received from the interactive data sources 70, the show controller 132 may coordinate a presentation of the output devices 134, 136, 138 to correspond with the interactive and/or reactive response of the animated FIG. 12 and the media control system 20.

Figure 4:
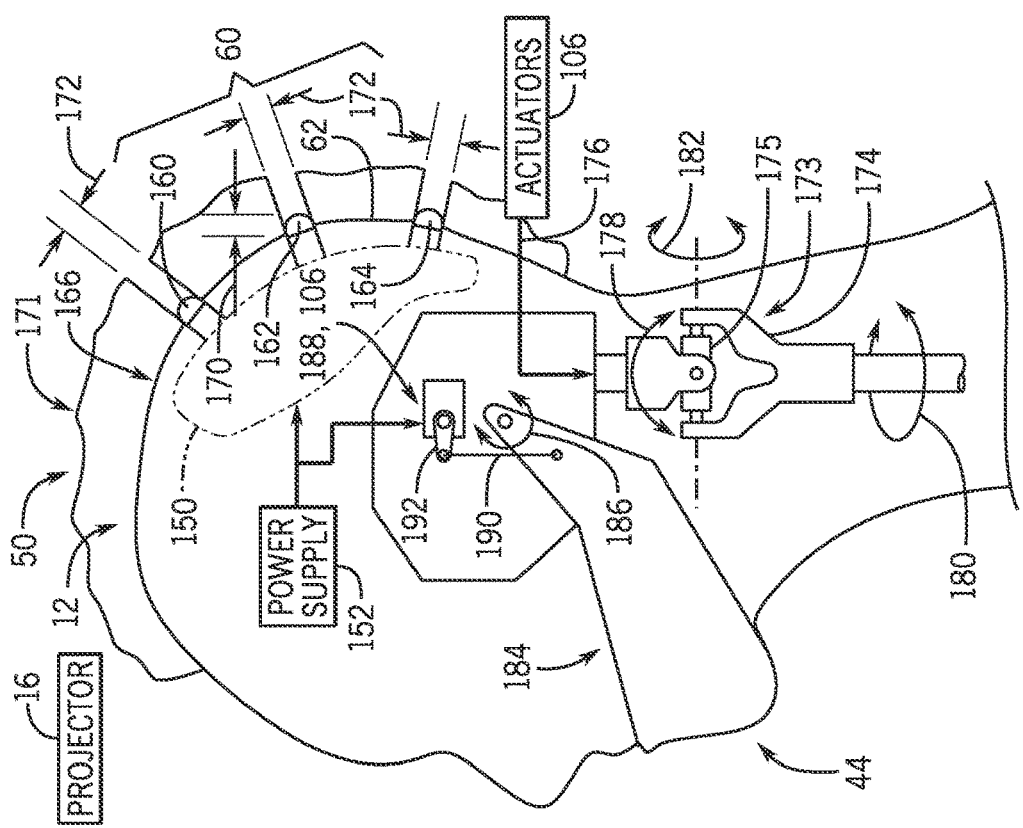
FIG. 4 is a cross-sectional schematic diagram of an embodiment of a head portion of the animated figure of FIG. 1 having an articulating jaw and rear-mounted trackable trackers, in accordance with embodiments of the present disclosure.

As one particular example of the present techniques, FIG. 4 is a cross-sectional side view of the head portion 44 of the animated FIG. 12 having the trackers 60 on the back surface 62 of the body 42, relative to the projector 16. The trackers 60 are active trackers (e.g., infrared light emitting diodes) in the present embodiment, and are thus connected in a circuit 150 that is coupled to or integrated with a power supply 152 of the animated FIG. 12. The power supply 152 may be a main power supply of the animated FIG. 12, or alternatively, a separate power supply that is dedicated to powering the trackers 60. Generally, the trackers 60 utilize electrical energy from the power supply 152 to emit individualized signals for resolution by the tracking cameras 64. For example, a first tracker 160 of the trackers 60 may emit a first signal having a first, unique identifying signal (e.g., frequency, signature, signal characteristic). A second tracker 162 and a third tracker 164 of the trackers 60 may also emit respective, unique identifying signals. By distributing the trackers 60 around a curved portion 166 of the head portion 44 of the body 42, the trackers 60 may enhance the traceability of the animated FIG. 12, such as by enabling the head portion 44 to be resolved by the tracking cameras 64 from multiple sides (e.g., top side, back side) of the animated FIG. 12.

Moreover, the trackers 60 may extend from the curved portion 166 of the animated FIG. 12 by a protrusion distance 170. Notably, because the signals emitted by the trackers 60 may pass through certain materials, the trackers 60 having the protrusion distance 170 may be hidden by a costume (e.g., wig, hat, fur) of the animated FIG. 12 to conceal the trackers 60 and further contribute to the realism of the animated FIG. 12. However, in the illustrated embodiment, the animated FIG. 12 includes a wig 171 having gaps 172 (e.g., apertures, openings, round holes) formed over the trackers 60 that further facilitate transmittal of the signals from the trackers 60 to the tracking cameras 64 discussed above. That is, the gaps 172 may be relatively small openings formed through the wig 171 that do not interfere with the signals, while enabling remaining portions of the wig 171 to efficiently conceal the trackers 60. Additionally, although illustrated with three trackers 60, it should be understood that any suitable number of trackers 60 may be included or concealed within the animated FIG. 12, such as one, two, five, ten, or more trackers 60. Alternatively, the trackers 60 may be flush with or even recessed within an outer surface of the animated FIG. 12, such as discussed below with reference to FIG. 5.

The animated FIG. 12 also includes a set of the actuators 106 to move the head portion 44 of the animated FIG. 12, in the present embodiment. For example, the actuators 106 may be operatively coupled to a multi-directional support 173, illustrated as a universal joint 174 (e.g., U-joint, universal coupling device) having a pivot bar assembly 175, to resemble or mirror motions of a human neck. In particular, based on selective force 176 provided by the actuators 106, the multi-directional support 173 may enable the head portion 44 to move along a head nod axis 178, a head turn axis 180, and/or a head tilt axis 182, thereby providing multiple degrees of freedom of motion to the animated FIG. 12. It should be understood that any suitable supporting elements or support structures having any suitable ranges and directions of movement may be included within the animated FIG. 12, to be actuated by any suitable actuators 106 that are either internal or external to the animated FIG. 12.

Moreover, the animated FIG. 12 of the present embodiment includes an articulating jaw 184 (e.g., moveable jaw) that may move along a jaw movement axis 186, such as based on movement by a jaw actuator 188 of the actuators 106. As such, based on instruction from the figure controller 102, the jaw actuator 188 may move the articulating jaw 184 along the jaw movement axis 186 (e.g., via adjusting a connected link 190 coupled between the articulating jaw 184 and a pivoting crank 192 on the jaw actuator 188) to enable the animated FIG. 12 to appear to be speaking (e.g., lip synchronizing with audio of the audio output devices 136), presenting varying facial expressions, and so forth. The animated FIG. 12 may additionally or alternatively include an articulating forehead, brow, ears, and/or any other moveable features that contribute to the realism of a particular person or character. Moreover, it should be understood that the articulating jaw 184 and/or any other articulating components of the animated FIG. 12 may be manipulated based on the selective force 176 applied by any suitable single or multiple actuators 106.

Figure 5:
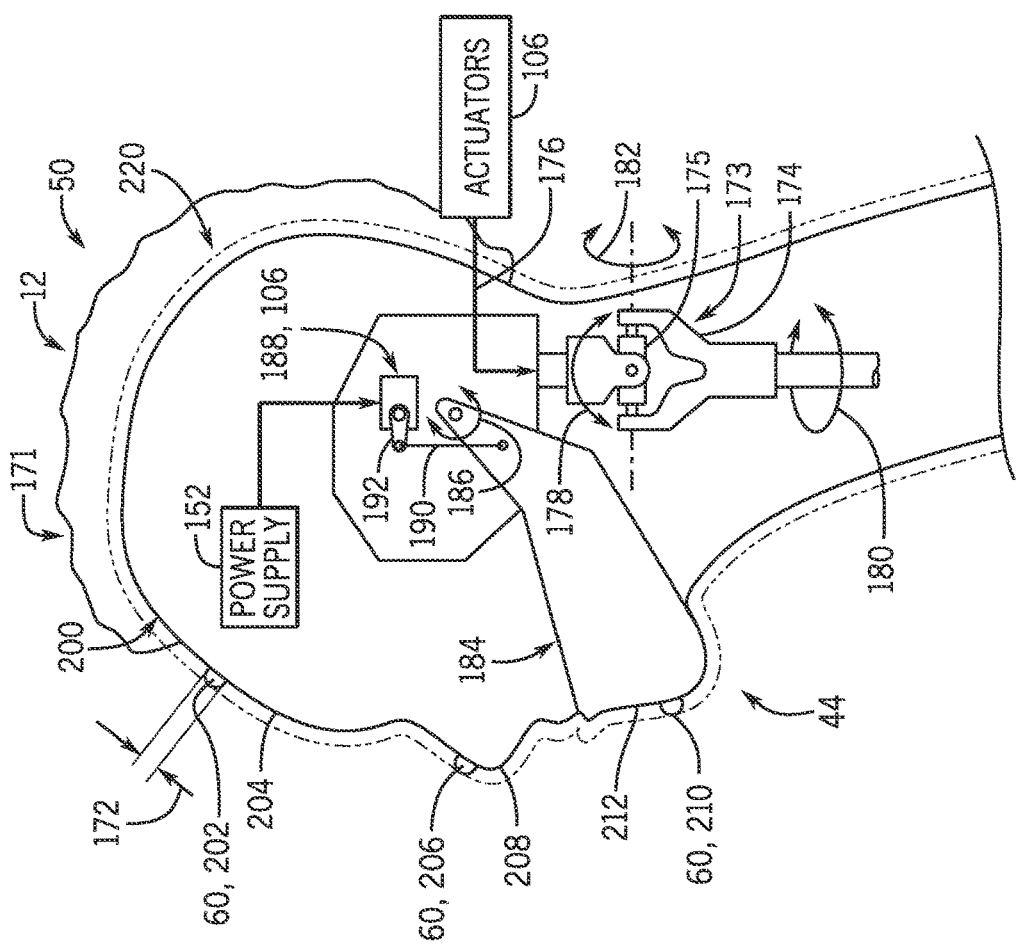
FIG. 5 is a cross-sectional schematic diagram of an embodiment of the head portion of the animated figure of FIG. 1 having front-mounted trackable trackers, in accordance with embodiments of the present disclosure.

FIG. 5 is a cross-sectional side view of another embodiment of the head portion 44 of the animated FIG. 12, in which the trackers 60 are mounted on a front surface 200 of the head portion 44. The trackers 60 may be passive devices that are distinguishable by the tracking cameras 64. In some embodiments, the passive devices are shaped as rounded cylinders or light emitting diodes, though it should be understood that the passive devices may have any other suitable shape, including spherical shapes, rectangular prism shapes, and so forth. As illustrated, a first tracker 202 is positioned on a forehead portion 204 of the animated FIG. 12, a second tracker 206 is positioned on a nose portion 208 of the animated FIG. 12, and a third tracker 210 is positioned on a chin portion 212 of the animated FIG. 12. By including the third tracker 210 on the chin portion 212, the animated FIG. 12 enables the media control system 20 to efficiently analyze the movement of the articulating jaw 184 relative to the nose portion 208 and/or forehead portion 204. For example, the media control system 20 may monitor a relative distance between the second tracker 206 and the third tracker 210 and determine a current position of the articulating jaw 184 relative to the nose portion 208 therefrom. Additionally, the animated FIG. 12 is illustrated with the wig 171, though it should be understood that any suitable costume elements may be coupled to the animated FIG. 12. As discussed above, when the wig 171 or other costume elements are designed to cover the first tracker 202 and/or other trackers 60, the costume elements may be formed with the gap 172 that enables more efficient resolution of the trackers 60 through the costume elements.

The animated FIG. 12 may also include a translucent layer 220 disposed over the body of the animated FIG. 12, thus providing a desired appearance (e.g., skin) to the animated FIG. 12, while enabling the tracking cameras to resolve the positon of the trackers 60 through the translucent layer 220. The translucent layer 220 may be made of any suitable material that enables resolution of the trackers 60 through the translucent layer 220, such as a material including fabric, plastic, silicone, rubber, and so forth. As such, the trackers 60 may be disposed underneath the translucent layer 220 or flush (e.g., level) with the translucent layer 220, in some embodiments, thereby enabling the trackers 60 to be concealed from guest view. Although discussed as having active devices as the trackers 60 in FIG. 4 and passive devices as the trackers 60 in FIG. 5, it should be understood that active devices and/or passive devices may be mounted on any suitable portion of the animated FIG. 12.

Figure 6:
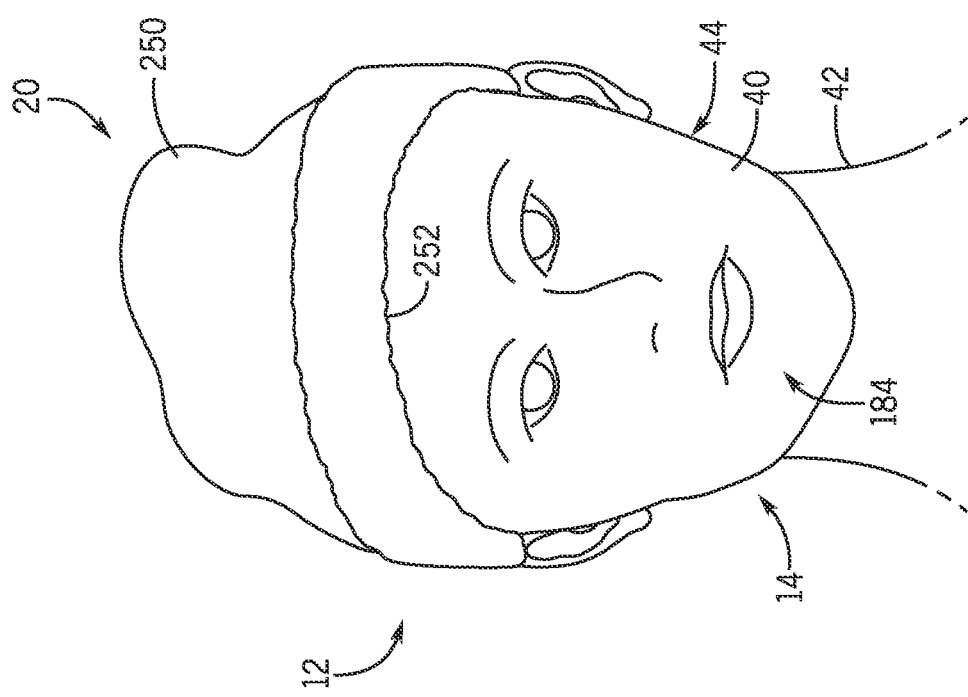
FIG. 6 is a front perspective view of an embodiment of facial features that are projection mapped onto the head portion of the animated figure of FIG. 1, in accordance with embodiments of the present disclosure.

As mentioned, based on the determined, actual position and orientation of the animated FIG. 12, the media control system 20 operates the projector 16 to deliver one or more images 14 or projected content onto the external surface 40 of the animated FIG. 12. As a particular example, FIG. 6 is a front perspective view of the images 14 provided onto the head portion 44 of the body 42 of the animated FIG. 12. In particular, the illustrated embodiment of the images 14 includes textures that resemble a face of a particular character. For example, eyebrows, eyes, a nose, lips, and/or wrinkles may be projected on to the head portion 44. Further, because the animated FIG. 12 is outfitted with a costume element 250, which is depicted as a hat in FIG. 6, the media controller 112 and/or the projector 16 may identify an outline 252 of the external surface 40 of the animated FIG. 12 formed by the costume element 250 (e.g., via projection masking). In other embodiments, the costume element 250 may additionally or alternatively include a wig, jewelry, a scarf, and so forth. Then, the projector 16 directs the images 14 to a target portion or figure portion of the external surface 40 of the animated FIG. 12. As mentioned above and discussed in more detail below, the media control system 20 may monitor movement of the animated FIG. 12, such as the articulating jaw 184, and project realistic images onto the head portion 44 of the animated FIG. 12 (or face portion thereof) to correspond to the particular, actual shape of the head portion 44 at any given time.

Figure 7:
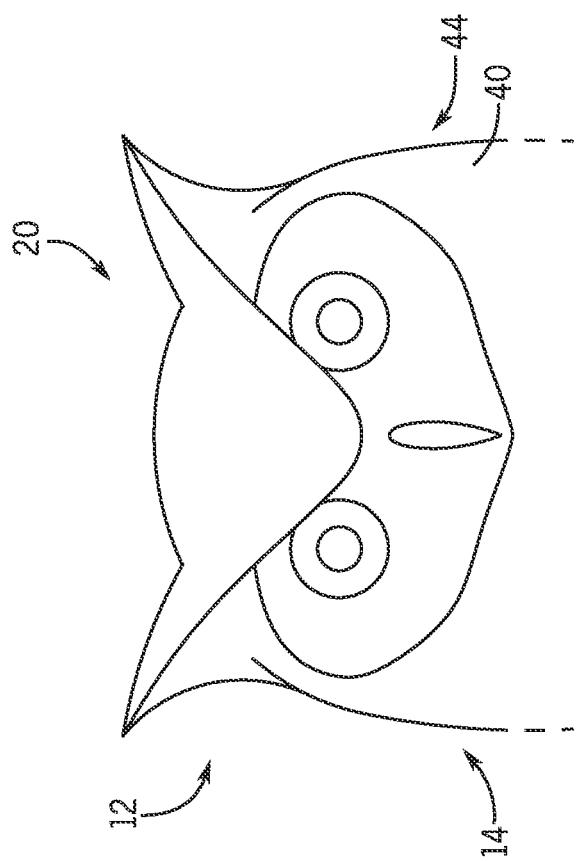
FIG. 7 is a front perspective view of another embodiment of facial features that are projection mapped onto the head portion of the animated figure of FIG. 1, in accordance with embodiments of the present disclosure.

As another example, FIG. 7 is a front perspective view of another embodiment of the images 14 that the projector 16 of the media control system 20 may provide onto the external surface 40 of the animated FIG. 12. As illustrated, the images 14 provide the animated FIG. 12 with a character, non-human, or fanciful appearance, such as the appearance of an owl. The external surface 40 of the head portion 44 may be textured to complement the images 14, in certain embodiments. It should also be understood that, in some embodiments, the images 14 may also include supernatural, fanciful, or non-human images and/or effects, such as flames, smoke, shapeshifting, color morphing, and so forth.

Figure 8:
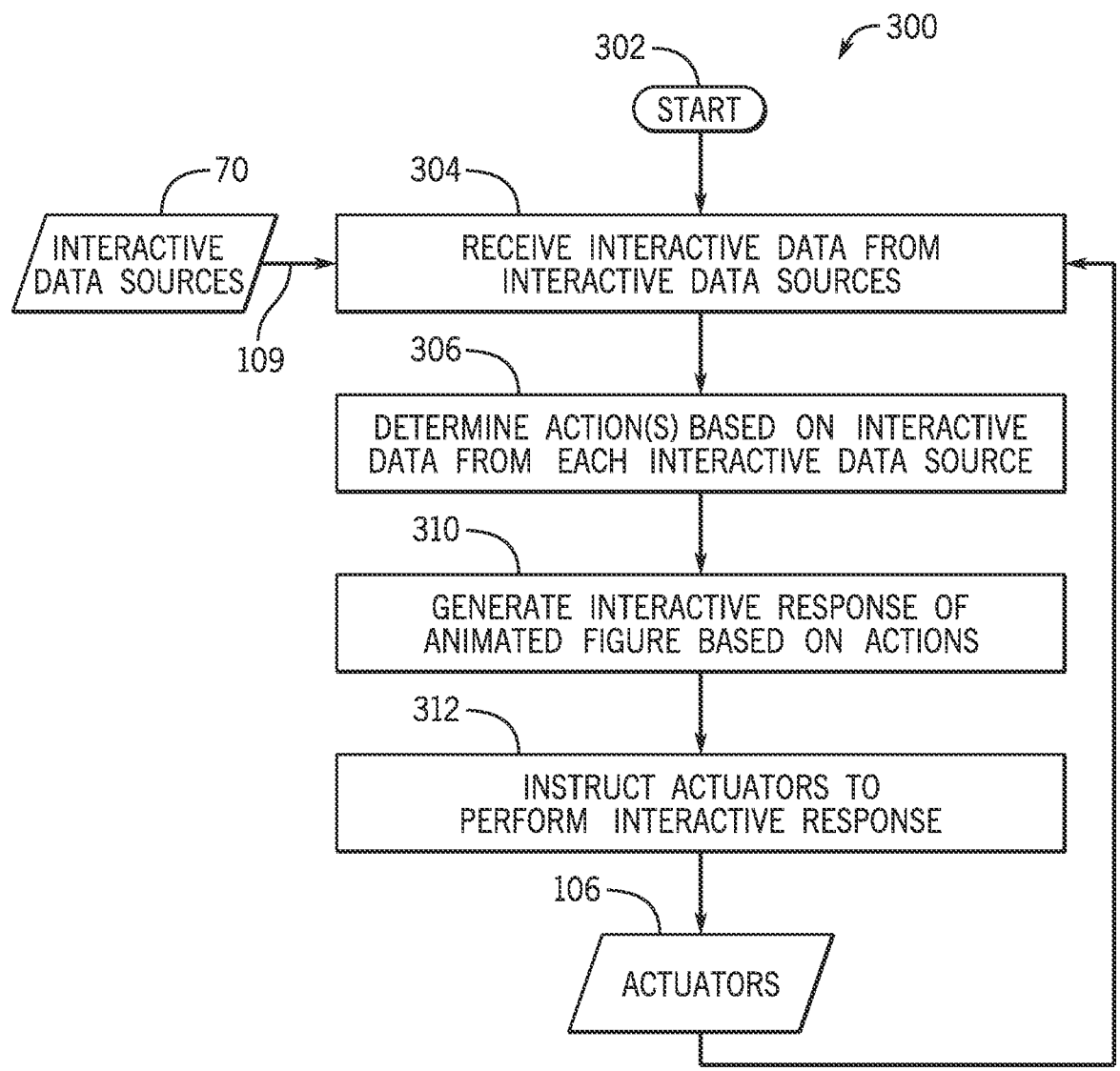
FIG. 8 is a flow diagram of an embodiment of a process by which a motion control system may control the animated figure of FIG. 1 to respond to the interactive data sources of FIG. 3, in accordance with embodiments of the present disclosure.

With the above features of the reactive media system 8 in mind, further discussion is provided herein regarding operation of the components of the reactive media system 8 to entertain the guests 34 via the animated FIG. 12 having the images 14 fitted thereon in real-time. For example, FIG. 8 is a flow diagram illustrating an embodiment of a process 300 by which the motion control system 50 may control the animated FIG. 12 to respond to interactive data 109 from the interactive data sources 70. The steps illustrated in the process 300 are meant to facilitate discussion and are not intended to limit the scope of this disclosure, because additional steps may be performed, certain steps may be omitted, and the illustrated steps may be performed in an alternative order or in parallel, where appropriate. The process 300 may be representative of initiated code or instructions stored in a non-transitory computer-readable medium (e.g., the figure memory 104) and executed, for example, by the figure processor 100 of the figure controller 102 of the motion control system 50. The figure processor 100 may be communicatively coupled to other components of the reactive media system 8 via a network, such as a wired or wireless network, to receive and send the instructions and signals described below.

In the presently illustrated embodiment, the figure controller 102 performing the process 300 starts (block 302) a show or display by receiving (block 304) one or more suitable streams of interactive data 109 from the interactive data sources 70, such as instructions from a dedicated game engine, a health status monitoring system of the motion control system 50, a global or main control system of the amusement attraction 10, a computing device associated with a technician of the amusement attraction 10, and/or sensor signals from the guest sensors 72 indicative of an action or position of at least one guest 34, and so forth. Indeed, as mentioned above, the interactive data 109 may also include time of day data, weather data, social media data, stock market data, ride vehicle position data, and/or any suitable data stream that may vary over time. For example, the figure controller 102 may receive time of day data from the interactive data sources 70 that indicates a particular character performance should be presented. As another example, the figure controller 102 may receive instructions from the dedicated game engine indicative of an instructed adjustment to the character performance. As a further example, the figure controller 102 may receive sensor signals from the guest sensors 72, which may transmit the sensor signals continuously, or alternatively, in response to detecting a particular motion or sound from the guest 34. In such embodiments, the guest sensors 72 may scan an RFID tag worn by each guest 34 and transmit identification information from the RFID tag to the figure controller 102 as the sensor signals.

Moreover, the figure controller 102 may determine (block 306) one or more actions based on the interactive data 109 received from each interactive data source 70. That is, the figure controller 102 may receive and simultaneously respond to multiple different interactive data sources 70, which may or may not include guest input. For example, the figure controller 102 may perform suitable animated figure control actions based on interactive data 109 received from a game engine, from a computing device associated with a technician of the amusement attraction 10, from a status monitoring system of the motion control system 50, and so forth. As a particular example, in response to receiving corresponding interactive data 109 from a computing device associated with a technician, the figure controller 102 may adjust the animated FIG. 12 from providing a detailed show performance (e.g., including more than a threshold number of movements) to providing a simplified show experience (e.g., including less than the threshold number of movements). As another example, in response to receiving weather data indicative of an oncoming weather change, the figure controller 102 may adjust the character or show performance to interact with the changed weather (e.g., acknowledge the presence of sun, rain, snow).

In embodiments that receive guest input, the actions determined by the figure controller 102 may include determining that the guest has performed a particular action (e.g., corresponding to active input) and/or has a particular set of qualities (e.g., corresponding to passive input). As examples of particular actions detectable by the guest sensors 72 as guest input, the figure controller 102 may determine that the guest 34 has moved within a threshold distance from the animated FIG. 12, waved, spoken, pressed a button, picked up a particular object, aimed a device (e.g., flashlight, laser pointer, imitation weapon) at a target portion of the animated FIG. 12, and so forth. As examples of particular sets of qualities sensed by the guest sensors 72 as guest input, the figure controller 102 may determine a height of each guest 34, determine an average height of a group of guests 34, retrieve profile information for each guest from a database based on the identification information of the RFID tag, identify that a particular guest 34 is wearing clothing having a target color, and so forth. Indeed, it should be understood that the figure controller 102 may determine any suitable information regarding the guests 34 and their particular actions in the guest area 32 to affect the interactions of the animated FIG. 12 with the guests 34, in accordance with the present techniques.

Further, the figure controller 102 may generate (block 310) an interactive response to be performed by the animated FIG. 12 as a reaction to the actions of the amusement attraction 10. That is, the figure controller 102 may calculate the interactive response to the interactive data 109 in substantially real-time, thereby reacting to the current state, actions, and positions of the amusement attraction 10 and/or the guests 34 therein for improved guest immersion in the amusement attraction 10. As one example, the figure controller 102 may receive input indicating that one guest 34 spoke an assigned name of the animated FIG. 12 from a particular position within the guest area 32. Then, the figure controller 102 may determine that the interactive response is for the animated FIG. 12 to wave a hand at the guest 34 in the particular position, move the articulating jaw 184 to correspond to the animated character speaking "Hi to you too," while the show control system 130 causes the audio output devices 136 of the amusement attraction 10 to output an utterance of "Hi to you too."

With the interactive response determined, the figure controller 102 following the process 300 instructs (block 312) the actuators 106 of the animated FIG. 12 to perform the interactive response. As discussed below with reference to FIG. 9, the media control system 20 simultaneously responds to the current pose of the animated FIG. 12 to dynamically contour map images 14 thereon. It should be understood that the show controller 132 may also simultaneously control any other output devices of the amusement attraction 10 based on the interactive data sources 70 to supplement the interactive response of the animated FIG. 12, including the stage lighting devices 30 (e.g., lighting instruments) or other lighting output devices 134, the audio output devices 136, the venue-specific special effect output devices 138 (e.g., smoke machines, air generating devices), and so forth. As an example, in response to one guest 34 pointing a flashlight at the animated FIG. 12, the show controller 132 may instruct the stage lighting devices 30 to dim, while the figure controller 102 instructs the actuators 106 to cause the animated FIG. 12 to raise both arms of the animated FIG. 12. As another example, in response to the guest 34 entering a particular region of the guest area 32 (e.g., as sensed by a light curtain, pressure mat, or depth camera of the guest sensors 72), the figure controller 102 may instruct the actuators 106 to move the animated FIG. 12 closer to the particular region.

After an interactive response is performed, the figure controller 102 may return to block 304 to continue receiving interactive data 109, such that the motion control system 50 continuously operates the animated FIG. 12 during operational hours of the amusement attraction 10. However, it should be understood that other embodiments may implement a show cycle that adjusts or stops in response to particular, predetermined conditions being met, such as a threshold amount of time having passed, a threshold number of interactive responses being performed, each guest 34 leaving the guest area 32, a new or subsequent ride vehicle entering the guest area 32, and so forth. In such cases, the motion control system 50 thus conserves operation and wear of the animated FIG. 12 until a next show cycle begins.

Figure 9:
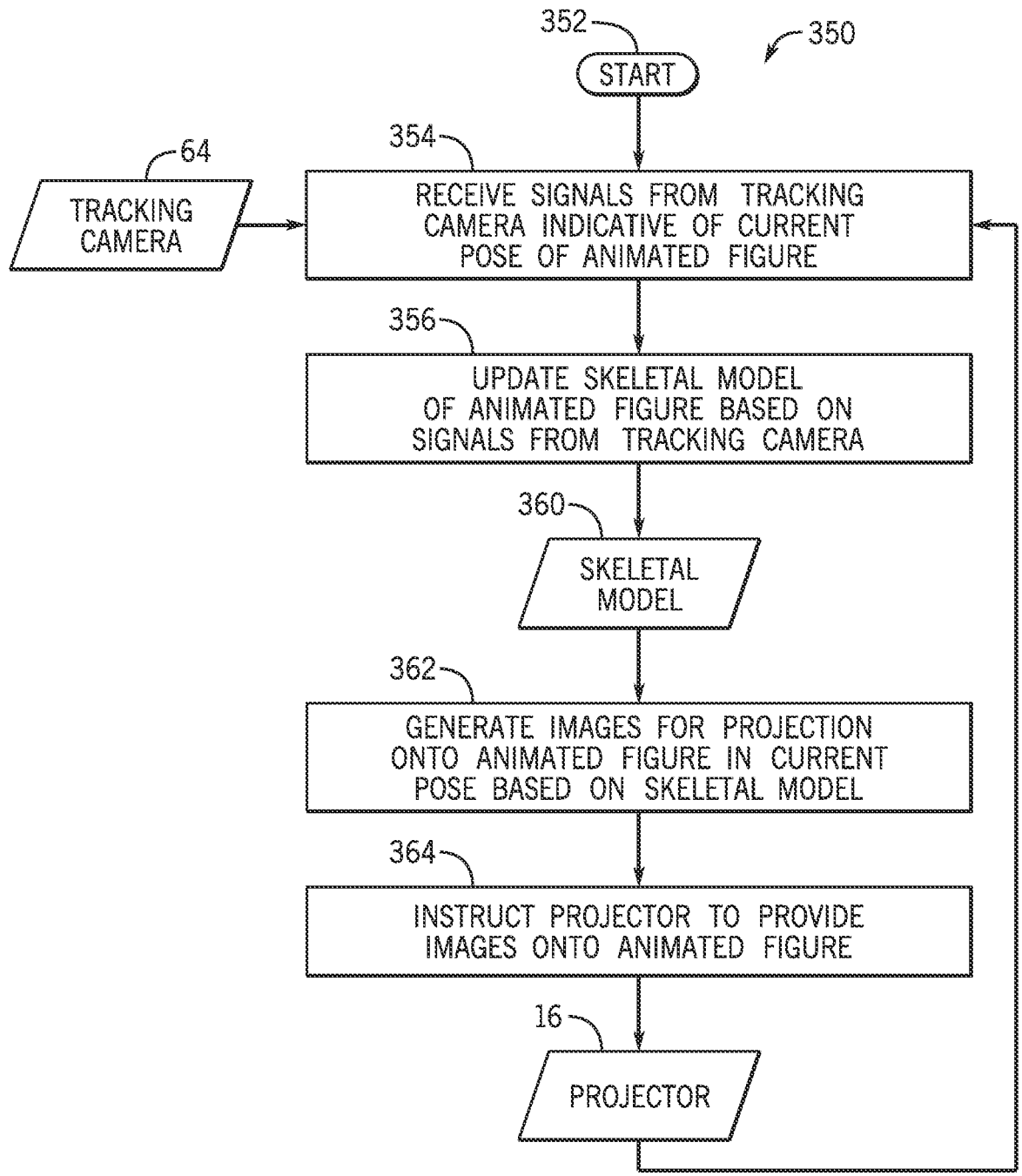
FIG. 9 is a flow diagram of an embodiment of a process for the media control system to dynamically project images onto the animated figure of FIG. 1, which may be responding to the interactive data sources at any given time, in accordance with embodiments of the present disclosure.

FIG. 9 is a flow diagram of an embodiment of a process 350 for the media control system 20 to dynamically map images 14 onto the animated FIG. 12. As mentioned with respect to the process 300 of FIG. 8, steps of the process 350 are not limiting. The process 350 may be representative of initiated code or instructions stored in a non-transitory computer-readable medium (e.g., the media memory 116) and executed, for example, by the media processor 114 of the media controller 112 of the media control system 20. It should be understood that the media processor 114 may be communicatively coupled to other components of the reactive media system 8 via a network, such as a wired or wireless network, to receive and send the instructions and signals described below.

To start (block 352) the process 350, the media controller 112 may receive (block 354) signals (e.g., sensor feedback) from the one or multiple tracking cameras 64 that are indicative of a current pose (e.g., current position, current orientation, and/or current scale) of the animated FIG. 12. The media controller 112 may receive the signals from the tracking cameras 64 though the camera network device 110, which facilitates efficient computations within the media controller 112. As noted above, the animated FIG. 12 includes the trackers 60 concealed thereon or therein to enable the tracking cameras 64 to identify the current pose of the animated FIG. 12, without receiving or relying on position, velocity, and/or acceleration information from the actuators 106 of the animated FIG. 12. In combination with an efficient scanning rate of the tracking cameras 64 and a frame rate of the projector 16, such a configuration enables the animated FIG. 12 to react to the interactive data 109 with reduced latency or lag, thereby more closely resembling a live character or person.

The media controller 112 may alternatively be coupled to the actuators 106 or the figure controller 102 and receive position, velocity, and/or acceleration information, which the media controller 112 may leverage to verify the detected pose of the animated FIG. 12. Indeed, the media controller 112 may predict future actions of the animated FIG. 12 based on the received position information, thereby according a lead-time to the media controller 112 for generating the projectable images. The media controller 112 operating predictively may generate multiple sets of images 14, each corresponding to a particular future interactive response of the animated FIG. 12. As such, the media controller 112 may therefore select one of the sets of projected content that was previously generated, enabling the media control system 20 to instantaneously provide the appropriate images (e.g., textures) when a given course of action of the animated FIG. 12 is realized.

The media controller 112, performing the process 350, updates (block 356) a skeletal model 360 of the animated figure based on the signals from the tracking cameras 64. The skeletal model 360 may include any suitable data structure and/or statistical model maintained in the media controller 112 to represent the moveable or actuatable portions of the animated figure, as well as the current position and orientation of the actuatable portions. As such, the media controller 112 may continuously update the skeletal model 360 to represent the actual, current pose (e.g., position, orientation, and scale) of the animated FIG. 12.

In certain situations in which a particular actuatable joint or portion of the animated FIG. 12 is non-operational, the media controller 112 updates the skeletal model 360 to indicate a non-operational status of the particular actuatable portion, while reacting to the current position of the trackers 60 to enable the images 14 to be adaptively fit to the partially non-operational animated FIG. 12. That is, in such situations, the media controller 112 performing the process 350 may generate suitable images that correspond to the actual pose of the animated FIG. 12, thereby ensuring an appropriate set of images are generated for the non-operational portions of the animated FIG. 12. In contrast, certain projection mapping systems following pre-programmed scenes (e.g., via canned media) may project images onto the expected position of a given moveable portion of a traditional animated figure, thereby detracting from guest experience when the given moveable portion becomes non-operational, as the images do not match the traditional animated figure.

The media controller 112 therefore generates (block 362) data indicative of the images 14 to be projected onto the animated FIG. 12 having the current pose based on the skeletal model 360. In contrast to predetermined or canned images, the images 14 are generated in-situ or in real time to particularly correspond to a current state or pose of the animated FIG. 12. Additionally, the data indicative of the images 14 and/or the current pose of the animated FIG. 12 may be stored in the media memory 116 for a predetermined time period.

The media controller 112 additionally instructs (block 364) the projector 16 to provide (e.g., contour map) the images 14 onto the animated FIG. 12 having the current pose. As recognized herein, the media control system 20 implements contour mapping or contour-focus mapping with the skeletal model 360 to direct the selectively designed images 14 onto targeted figure portions of the animated FIG. 12 in a lifelike manner. For example, the media controller 112 may generate, and instruct the projector 16 to output, the images 14 that are tuned to the particular position and orientation of the animated FIG. 12, thereby generating a contour mapped set of textures that are precisely focused to the particular spatial positioning of the animated FIG. 12. The media controller 112 may inherently provide the instructions of block 364 by transmitting the data indicative of the images 14 to the projector 16 without a separate instruction signal, thereby further limiting latency of the media control system 20. As such, the components of the media control system 20 cooperate to adaptively analyze the animated FIG. 12 and dynamically fit the images 14 onto an instantaneous pose of the animated FIG. 12, which may be reacting to the interactive data sources 70 and/or interacting with the guests 34 at any given time. The media controller 112 may therefore return to block 354 to continue receiving sensor signals and continue performing the process 350.

Moreover, the media control system 20 may monitor performance and or health of the animated FIG. 12. For example, it is presently recognized that the media control system 20 may perform health monitoring of the animated FIG. 12 based on the determined performance of the animated FIG. 12 over time. That is, if a particular set of images was projected onto the animated FIG. 12 at a particular time point during a show cycle (e.g., a baseline performance assessment), and after a period of time, the media control system 20 adjusted (e.g., displaced) the set of images for the particular time point in a later show cycle by more than a threshold adjustment (e.g., current performance assessment), the media control system 20 may generate an alert indicative of the difference between the iterations of the show cycle. For example, if the head portion 44 of the animated FIG. 12 is unintentionally modified or degraded such that a left ear of the animated FIG. 12 is not present and is not projected onto via the projector 16, the media control system 20 may alert an operator to the degradation. As another example, if a particular portion of the animated FIG. 12 moved during a first show cycle, such as a tilt or rotation of the head portion 44, but is stationary during a second show cycle (e.g., corresponding to a modified skeletal model 360), the media control system 20 may output an alert indicative of a non-operational portion of the animated FIG. 12. In these situations, the media controller 112 may output an alert indicative of the degraded status and/or sensed, uncharacteristic behavior change. In some cases, the reactive media system 8 may be designed to stop operation of the media control system 20 and/or the motion control system 50 in response to the alert. In other cases, in response to determining that the performance of the animated FIG. 12 is only marginally affected (e.g., has a skeletal model deviation that is more than a first threshold and less than a second, higher threshold), the media controller 112 may provide the alert and continue cycling through the process 350. Therefore, it should be understood that the present media control system 20 may operate as a quality assessment tool that quantifies the performance of the motion control system 50 and the animated FIG. 12 over time.

As such, technical effects of the disclosed reactive media system include a motion control system with an animated figure that dynamically reacts to interactive data, such as game engine, health monitoring system, background performer, guest, and/or technician input, to deliver an engaging and realistic experience to amusement attraction guests. In particular, the motion control system may include one or multiple interactive data sources that provide interactive data, such as guest sensors that sense active actions and/or passive qualities of the guests as the guest input, as well as a figure controller that generates an interactive response based on the interactive data. Therefore, the figure controller instructs actuators within a body of the animated figure to perform the interactive response, such as by manipulating an articulating jaw or other moveable portions of the body. Moreover, the reactive media system includes a media control system having tracking cameras, a media controller, and a projector. As recognized herein, the animated figure is fitted with trackable markers that enable the media controller to receive, from the tracking cameras, sensor feedback indicative of a current position, orientation, and scale of moveable portions of the animated figure. Therefore, without relying on information derived from the actuators of the animated figure, the media controller may dynamically generate or tailor a set of images to the particular position, orientation, and scale of the moveable portions of animated figure. Then, the media controller may instruct the projector to projection map the images onto an external surface of one or more figure portions of the animated figure in real-time, thereby presenting an immersive and engagingly-lifelike animated figure for improved guest enjoyment with improved up-time and/or reliability.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A reactive media system of an amusement attraction, the reactive media system comprising:
   a motion control system, comprising:
      an animated figure having a body and a set of actuators configured to adjust a figure portion of the body in response to interactive data received from one or more interactive data sources; and
      a set of trackers coupled to a first surface of the figure portion of the body, wherein each tracker of the set of trackers is configured to emit a respective sensor signal; and
   a media control system, comprising:
      a tracking camera configured to:
         receive the respective sensor signals from the set of trackers;
         determine a position of the set of trackers relative to one another, relative to the tracking camera, or both based on receipt of the respective sensor signals; and
         generate state signals indicative of a current position and a current orientation of the figure portion based on the position of the set of trackers;
      a media controller communicatively coupled to the tracking camera and configured to:
         receive the state signals indicative of the current position and the current orientation of the figure portion;
         determine the current position and the current orientation of the figure portion based on the state signals; and
         generate data indicative of images to be projected onto at least a second surface of the figure portion having the current position and the current orientation, wherein the second surface comprises an external surface and wherein the second surface is different than the first surface; and
      a projector communicatively coupled to the media controller, wherein the projector is configured to: receive the data indicative of the images from the media controller and project the images onto the second surface of the figure portion having the current position and the current orientation.

2. The reactive media system of claim 1, wherein the one or more interactive data sources comprise a guest sensor configured to generate guest sensor signals indicative of guest input as the interactive data, wherein the motion control system comprises a figure controller coupled to the guest sensor and the set of actuators, wherein the figure controller is configured to:
   determine the guest input based on the guest sensor signals from the guest sensor;
   generate an interactive response of the animated figure to the guest input; and
   instruct the set of actuators to perform the interactive response.

3. The reactive media system of claim 2, wherein the guest sensor comprises at least an optical transducer, a mechanical transducer, an electro-mechanical transducer, an electro-magnetic transducer, an auditory transducer, a pressure transducer, or a temperature transducer.

4. The reactive media system of claim 2, comprising a show controller communicatively coupled to the guest sensor and to at least one output device disposed within the amusement attraction, wherein the show controller is configured to control the at least one output device to provide an output in conjunction with the interactive response of the animated figure, and wherein the at least one output device comprises a light output device, an audio output device, or both.

5. The reactive media system of claim 1, comprising the one or more interactive data sources, wherein the one or more interactive data sources are configured to generate the interactive data as input data that is variable over time and responsive to a current state of the animated figure.

6. The reactive media system of claim 1, comprising the one or more interactive data sources, which comprise a guest sensor configured to detect guest input from a guest of the amusement attraction as the interactive data, and wherein the guest input comprises a position, a movement, or an action of the guest that is detectable by the guest sensor.

7. The reactive media system of claim 1, wherein the media control system is configured to project the images onto the second surface of the figure portion without receiving position, velocity, or acceleration information from the set of actuators of the animated figure.

8. The reactive media system of claim 1, wherein each tracker of the set of trackers is concealed from view to a guest and disposed within a surface of the figure portion of the animated figure, and each tracker is configured to emit the respective sensor signal through the surface for receipt by the tracking camera.

9. The reactive media system of claim 1, wherein the figure portion comprises an actuatable portion of a character that is coupled to a support structure of the character.

10. The reactive media system of claim 1, wherein the media control system comprises a plurality of tracking cameras that comprises the tracking camera, and wherein the plurality of tracking cameras is coupled to a camera network device that is coupled to the media controller.

11. The reactive media system of claim 1, wherein the figure portion of the animated figure comprises a face portion of the body having a moveable jaw with at least one degree of freedom onto which the projector is configured to project at least a portion of the images, wherein a portion of the set of actuators is configured to actuate the moveable jaw, and wherein the motion control system is configured to instruct the portion of the set of actuators to actuate the moveable jaw in response to the interactive data.

12. The reactive media system of claim 1, wherein the respective sensor signal emitted by each tracker of the set of trackers comprises a unique identifier, and the tracking camera is configured to distinguish each tracker of the set of trackers from one another based on the unique identifier of the respective sensor signals to determine the position of the set of trackers relative to one another, relative to the tracking camera, or both.

13. The reactive media system of claim 1, wherein the animated figure comprises a translucent layer disposed over the body, wherein the set of trackers and the first surface are disposed beneath the translucent layer.

14. The reactive media system of claim 1, wherein the tracking camera is configured to generate the data indicative of additional images to be projected onto the first surface.

15. A reactive media system of an amusement attraction, the reactive media system comprising:
  one or more interactive data sources configured to generate interactive data that is variable over time;
  a motion control system comprising:
    an animated figure disposed within the amusement attraction, wherein the animated figure comprises a figure portion that comprises a moveable joint;
    a set of actuators disposed within the figure portion and configured to actuate the moveable joint; and
    a figure controller communicatively coupled to the set of actuators and to the one or more interactive data sources, wherein the figure controller is configured to:
      based on the interactive data received from the one or more interactive data sources, determine an interactive response of the animated figure corresponding to a current state of the animated figure, wherein the interactive response comprises actuating the moveable joint; and
      instruct the set of actuators to perform the interactive response;
  a set of trackers coupled to the figure portion of the animated figure; and
  a media control system comprising:
    a tracking camera configured to:
      visibly distinguish each tracker of the set of trackers to obtain a visualization of the set of trackers;
      determine a respective position of each tracker of the set of trackers based on the visualization of the set of trackers; and
      generate a signal indicative of a current position and of a current orientation of the animated figure based on the respective position of each tracker of the set of trackers; and
    a media controller communicatively coupled to the tracking camera and configured to:
      receive the signal indicative of the current position and of the current orientation of the animated figure from the tracking camera; and
      generate content to be projected onto a portion of the animated figure based on the current position and the current orientation of the animated figure and the interactive response;
    wherein the media controller is configured to identify a non-operational portion of the animated figure based on the determined respective position of each tracker of the set of trackers and to adjust the generated content based on the identified non-operational portion.

16. The reactive media system of claim 15, wherein the media control system comprises a projector communicatively coupled to the media controller, wherein the projector is configured to receive data indicative of the content from the media controller and project the content onto the animated figure having the current position and the current orientation.

17. The reactive media system of claim 16, wherein the projector is configured to move, based on instructions from the media controller, to align with the current position and the current orientation of the animated figure.

18. The reactive media system of claim 15, wherein the motion control system comprises an actuatable motion device physically coupled to the animated figure and communicatively coupled to the figure controller, and wherein the interactive response comprises instructing the actuatable motion device to move the animated figure in at least one direction relative to a stage or ground surface of the amusement attraction.

19. The reactive media system of claim 18, wherein the actuatable motion device is at least partially disposed underneath the animated figure.

20. The reactive media system of claim 15, wherein the set of trackers comprises a first tracker disposed on the moveable joint of the figure portion and comprises a second tracker disposed on a different portion of the animated figure that is distinct from the moveable joint, wherein the tracking camera is configured to determine a first position of the first tracker, a second position of the second tracker, a current distance between the first tracker and the second tracker based on the first position relative to the second position, and generate the signal indicative of the current position and of the current orientation of the animated figure based on the current distance.

21. The reactive media system of claim 15, wherein the one or more interactive data sources comprise a guest sensor configured to sense input indicative of an interaction of a guest of the amusement attraction with the animated figure as the interactive data.

22. The reactive media system of claim 15, wherein each tracker of the set of trackers is concealed within a surface of the figure portion of the animated figure, and the tracking camera is configured to visibly distinguish each tracker of the set of trackers through the surface to obtain the visualization of the set of trackers.

23. The reactive media system of claim 15, wherein the media controller is configured to generate the signal indicative of the current position and the current orientation of the animated figure without using position, velocity, and/or acceleration information from actuators of the animated figure.

24. The reactive media system of claim 15, wherein the figure controller is configured to switch from a detailed control instruction set to a simplified control instruction set based on the interactive data, wherein the detailed control instruction set comprises a greater number of movements of the animated figure relative to the simplified control instruction set.

* * * * *